May 17, 1949.  R. J. WENGER  2,470,385
AIR HAMMER WITH BALL-TYPE TOOL RETAINING CHUCK
Filed March 8, 1946
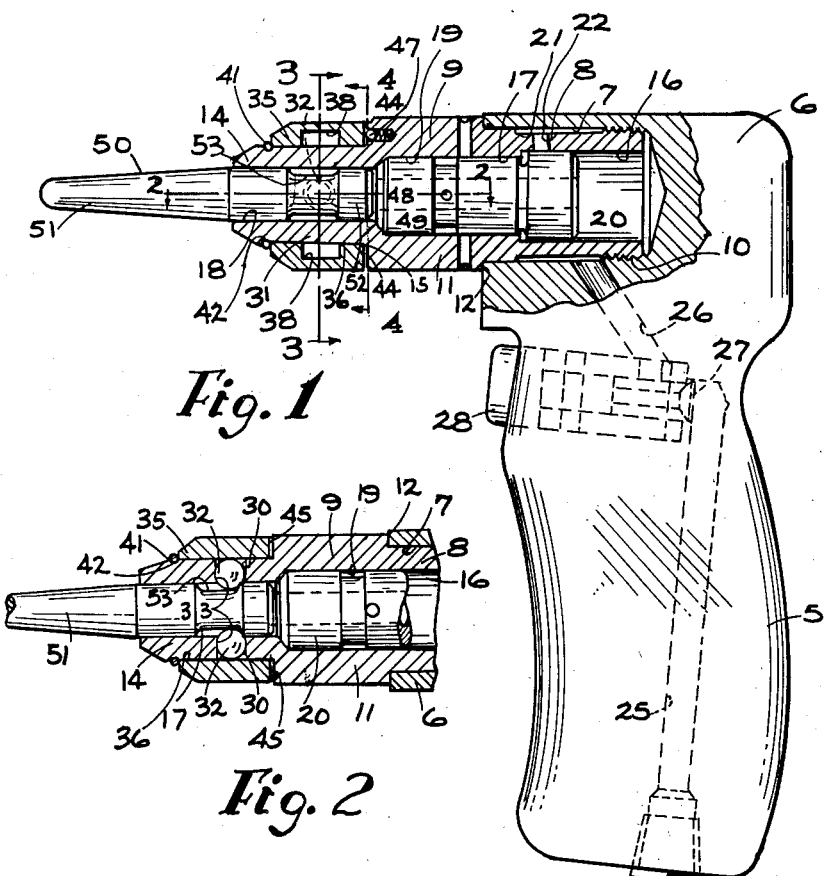
INVENTOR:
RUSSELL J. WENGER
BY
HARRIS, KIECH, FOSTER & HARRIS
FOR THE FIRM
ATTORNEYS Patented May 17, 1949

2,470,385

UNITED STATES PATENT OFFICE 2,470,385

AIR HAMMER WITH BALL-TYPE TOOL RETAINING CHUCK

Russell J. Wenger, North Hollywood, Calif., assignor, by mesne assignments, to J. W. Merrick, Los Angeles, Calif.

Application March 8, 1946, Serial No. 653,075

9 Claims. (Cl. 125—33)

1

This invention relates generally to tool holders and particularly to a tool holding device for use in power operated tool-actuating implements such as pneumatic hammers.

Pneumatic hammers are commonly employed for performing riveting, cutting and other fabricating operations and such devices are provided with means for holding various types of fabricating tools and with pneumatically operated hammer means for reciprocating said tools. The tool holding means usually includes expansible members which are expanded to permit insertion of the tool into the implement and contracted to retain the tool therein, said members being manually expanded and contracted by means of cam- or-screw actuated members. Such tool-holding devices are usually relatively complicated in construction and require considerable servicing and replacement of parts, especially when they are used for mounting reciprocable tools in pneumatic hammers and the like.

It is a particular object of my invention to provide a tool holder which is adapted to be incorporated in a pneumatic hammer or similar implement for mounting various types of fabricating tools.

Another object is to provide a tool holder of the character referred to which is adapted to attach a fabricating tool to the pneumatic hammer to permit the tool to be reciprocated by the hammering mechanism.

Another object is to provide a tool holder which may be conveniently operated by the simple act of rotating one of its elements to retain a tool in place or to release said tool to permit removal from the implement.

Another object is to provide a tool holder which is relatively simple in construction, durable in use and generally more efficient than prior devices of similar types.

Further objects of my invention will appear from the following specification and the drawing which is intended for the purpose of illustration only, and in which:

Fig. 1 is a part-sectional side elevational view of a conventional type of pneumatically operated implement in which is incorporated a tool holding device constructed in accordance with my invention;

Fig. 2 is a longitudinal sectional view through

2 the tool holding device, taken on line 2—2 of Fig. 1;

Fig. 3 is a cross-sectional view taken on line 3—3 of Fig. 1; and

Fig. 4 is a cross-sectional view taken on line 4—4 of Fig. 1

While my improved tool holder may be incorporated in various types of implements, I have found it especially adaptable for use as the means for attaching a fabricating tool to a pneumatic hammer and the present drawing illustrates the holder as applied to such a hammer. The conventional type of pneumatic hammer, herein illustrated by way of example, may comprise a handle portion 5 having a head 6 at its upper end. The head 6 has a bore 7 for receiving the reduced inner end 8 of a tubular body member 9. The inner end of the bore 7 is screw threaded to adapt the inner threaded portion 10 of the body member 9 to be screwed thereinto to assemble these parts. The body member 9 is provided with an enlarged portion 11, the rearward face 12 of which abuts the forward end of the head 6 and with a reduced sleeve portion 14, a radial shoulder or face 15 being formed between the portions 11 and 14. The body member 9 has an axial bore which consists of an inner portion 16, a reduced intermediate portion 17 and a further reduced outer portion 18 preferably of polygonal cross section. The portions 16 and 17 together constitute a cylinder 19 in which a piston or hammer member 20 is adapted to reciprocate.

Since the means for reciprocating the hammer member 20 may be of any known type, such means is herein described only briefly as relating to the function of the present tool holding device. Suffice it to state that the hammer member 20 is reciprocated under the action of compressed air introduced into a peripheral groove 21 in the body member 9 and adapted to pass through a port 22 to be directed against suitable shoulders on the hammer member. Implements of this type are usually connected to an air hose by means of a coupling 24 and the compressed air is adapted to flow through ducts 25 and 26 in the handle portion 5, the duct 26 being in fluid communication with the peripheral groove 21. Interposed between the ducts 25 and 26 is a slidable valve member 27 for controlling the flow of air through the implement and the valve member is provided with a finger piece 28 for facilitating the manual operation of the valve member.

The sleeve portion 14 of the body member 9 is provided with diametrically opposed apertures 30 extending radially through its annular wall 31 and adapted to receive locking balls 32. The balls 32 are of greater diameter than the thickness of the annular wall 31 of the body member 9. The sides of the apertures 30 are tapered inwardly at their inner ends to provide annular shoulders 33 which serve as stops for limiting the inward sliding movement of the balls.

Rotatably mounted on the sleeve portion 14 of the body member 9 is an annulus or operating member 35 having a bore 36. As shown in Figs. 1 and 3, the inner surface of the operating member 35 is provided with diametrically opposite arcuate recesses 38 of a radius preferably equal to the radius of the bore 36. The bottom surfaces of the recesses 38 adjacent their ends constitute cam faces 39 which are adapted to engage the balls 32 and force them radially inward when the operating member 35 is rotated to the position shown in Fig. 3. The operating member 35 is positioned on the sleeve portion 14 of the body member 9 with its rearward end abutting the face 15 and retained in place by means of a resilient ring 41 which is slid over the end of the sleeve portion 14 and snapped into a peripheral groove 42 in the sleeve portion.

The rearward end face of the operating member 35 is provided with four equally-spaced notches 44 and 45, the notches 44 being disposed in diametrical alignment with the recesses 38 while the other two notches 45 are arranged at right angles thereto. A detent element 47, preferably in the form of a ball, is slidable in a hole 48 drilled in the face 15 of the body member 9 and urged outwardly by a coil spring 49 pocketed in the hole to adapt it to engage in the notches 44 to retain the operating member 35 in its various positions of angular adjustment.

To operate the tool holding device, the operating member 35 is first rotated on the sleeve portion 14 of the body member 9 to a position wherein its arcuate recesses 38 are aligned with the balls 32 and the detent ball 47 is caused to snap into one of the notches 45 to yieldingly retain the operating member in this position of adjustment. The present improved tool holding device is adapted to retain various types of fabricating tools in the bore 17 of the sleeve portion 14, the drawing illustrating such a tool 50. The tool 50 may have an outer work-engaging end 51 of any suitable form and an inner end 52 provided with a peripheral groove 53. When the operating member 35 is rotated to the position explained above the locking balls are released so that they may move radially outward when the inner end 52 of the tool 50 is inserted in the bore 18.

After the end of the tool 50 has been inserted into the bore 18 with its peripheral groove 53 in alignment with the locking balls 32, the operating member 35 is rotated through ninety degrees and during this rotary movement the cam faces 39 of the recesses 38 will act to cam the balls inwardly to the position shown in Figs. 2 and 3 so that their inner sides will engage in the peripheral groove 53 to lock the tool in place in the hammer implement. As the operating member 35 approaches this position, the detent ball 47 will snap into one of the notches 44 to hold the member in its adjusted relation.

It is apparent that when the fabricating tool 50 is supported within the hammering implement the balls 32 which are engaged in the groove 53 serve to limit longitudinal sliding movement of the tool in either direction. To apply the implement to use, the handle portion 5 is held in the hand and the end 51 of the fabricating tool placed against the work in a manner determined by the type of tool employed and the particular work to be done. The finger-piece 28 is then depressed to open the valve 27 to permit compressed air to pass into the peripheral groove 21 and port 22 to reciprocate the hammer member 20 in the cylinder 19. At each forward stroke of the hammer member 20 its forward end will strike the rearward end 52 of the tool 50 to propel the tool outwardly and the extent of such outward movement will be limited through the engagement of the balls 32 with the rearward end of the groove 53. Return movement of the tool is effected by pressure manually exerted against the tool as the latter is held firmly against the work and the return or inward movement of the tool will be limited by the engagement of the balls 32 with the outer end of the groove 53. Thus the tool 50 is rapidly and intermittently reciprocated to perform its intended function and to arrest such operation the finger-piece 28 is released to permit the valve 27 to close and thereby disrupt the flow of compressed air to the port 22.

When it is desirable to change tools, the operating member 35 may be rotated through ninety degrees, in either direction, to align its recesses 38 with the balls 32 to release the latter and permit the tool 50 to be withdrawn from the implement, after which another tool may be attached in the manner explained before. It has been explained that the bore 17 of the body member 9 may be of polygonal shape in cross section and through this provision tools having an inner end of similar cross section may be locked in place in the bore and thus keyed against rotation. This is important when certain types of tools are employed and must be held in fixed relation to the work piece.

It will be observed from the foregoing that the present invention provides a particularly simple, yet ingenious tool holder adapted to retain fabricating tools in various tool operating implements such as pneumatic hammers in which the tools must be reciprocated. As a particular feature of improvement, the present improved tool holder employs locking balls which are slidable into and out of engagement with a peripheral groove in the tool and has rotary operating means for actuating the balls, thereby simplifying the manual operation of the device and greatly expediting the attachment of the tools. The improved device is relatively inexpensive to manufacture and may be incorporated in the mechanism of the hammering tool during its manufacture or made as a separate device adapted for attachment to existing implements.

While I have herein shown and described the improved tool holder as embodied in a preferred form of construction and applied to use in a particular manner, it will be understood that various modifications may be made in the construction and arrangement of its parts and in the manner of applying the device to use without departing from the spirit of the invention and I reserve the right to all changes, modifications, and substitutions as properly come within the scope of my appended claims.

I claim as my invention:

1. A holder for a tool having a peripheral groove, comprising: a body member having an annular wall defining a bore and provided with a hole extending radially through said wall; a locking element slidable in said hole, said locking element being of greater length than the width of said wall and of smaller width than the width of the peripheral groove of the tool; an annular member rotatably mounted on said body member and provided with a non-circular recess in its inner surface; and retaining means for retaining said annular member axially in place on said body member, said annular member being rotatable to position its recess in radial alignment with said element to permit said element to move radially outward to allow the tool to be inserted in said bore, and said annular member being rotatable to position its inner surface in alignment with said element whereby to project said element radially inward to engage in the peripheral groove and retain said tool in place in said holder while permitting said tool to move axially within said holder.

2. A holder for a tool having a peripheral groove comprising: a body member having a bore and provided with holes extending radially through its sides; locking elements slidable in said holes, said locking elements being of greater length than the thickness of said wall and of smaller width than the width of the peripheral groove of the tool; an annular operating member rotatably mounted on said body member and provided with an elliptical bore; and retaining means for retaining said operating member axially in place on said body member, said operating member being rotatable to position the major axis of its elliptical bore in radial alignment with said elements to permit said elements to move radially outward to allow the tool to be inserted in said bore of said body member, and said operating member being rotatable to position the minor axis of its elliptical bore in alignment with said elements whereby to project said elements radially inward to cause them to engage in the peripheral groove and retain said tool in place in said holder while permitting limited axial movement of said tool in said holder.

3. A holder for a tool having a peripheral groove, comprising: a body member having an annular wall defining an axial bore and provided with holes extending radially through said wall; balls slidable in said holes, the diameter of said balls being greater than the thickness of said wall and less than the width of the peripheral groove of said tool; an annular operating member rotatably mounted on said body member and provided with an elliptical bore; and retaining means for retaining said operating member axially in place on said body member, said operating member being rotatable to position the major axis of its elliptical bore in radial alignment with said balls to permit said balls to move radially outward to allow the tool to be inserted in said bore, and said operating member being rotatable to position the minor axis of its elliptical bore in alignment with said balls whereby to project said balls radially inward to cause them to engage in the peripheral groove and retain said tool in place in said holder while permitting limited axial movement of said tool in said holder.

4. A holder for a tool having a peripheral groove, comprising: a cylindrical body member having a reduced axial extension provided with a shoulder and having an axial bore, said extension being provided with circumferentially spaced holes extending radially through its annular wall and also provided with a circumferential groove in its periphery; balls slidable in said holes, the diameter of said balls being greater than the thickness of said wall but smaller that the width of the peripheral groove of said tool; an annular operating member rotatably mounted on said extension and provided with an elliptical bore; and a resilient element engageable in said groove of said extension for retaining said operating member in place on said extension abutting said shoulder and with said elliptical bore in longitudinal alignment with said balls, said operating member being adapted to be rotated to cause the minor axis of said elliptical bore to project said balls radially inward into the peripheral groove of the tool inserted in said bore to retain said tool in place in said holder while permitting limited axial movement of said tool in said holder, and said operating member being adapted to be rotated to position the major axis of its elliptical bore in radial alignment with said balls to permit said balls to move radially outward to release said tool to permit withdrawal of said tool from said holder.

5. A holder for a tool having a peripheral groove, comprising: a cylindrical body member having a reduced axial extension provided with a radial shoulder and said body member having an axial bore, said extension being provided with circumferentially spaced holes extending radially through its annular wall and also provided with a circumferential groove in its periphery; balls slidable in said holes, the diameter of said balls being greater than the thickness of said annular wall but less than the width of the peripheral groove of the tool; an annular operating member rotatably mounted on said extension and provided with an elliptical recess in its inner surface; a resilient element engageable in said groove of said extension for retaining said operating member in place on said extension abutting said shoulder to longitudinally align said recess with said balls, said operating member being rotatable to position the major axis of its elliptical bore in radial alignment with said balls to permit said balls to move radially outward to allow the tool to be inserted in said bore, and said operating member being rotatable to position the minor axis of its elliptical bore in alignment with said balls whereby to project said balls radially inward to cause them to engage the peripheral groove and retain said tool in place in said holder while permitting limited axial movement of said tool in said holder and detent means for releasably holding said operating member in either of said positions.

6. A holder for a tool having a peripheral groove, comprising: a cylindrical body member having a reduced axial extension provided with a radial shoulder therebetween and said body member having an axial bore, said extension being provided with circumferentially spaced holes extending radially through its annular wall and also provided with a circumferential groove in its periphery; balls slidable in said holes, the diameter of said balls being greater than the thickness of said annular wall but less than the width of the peripheral groove of the tool; an annular operating member rotatably mounted on said extension and provided with an elliptical recess in its inner surface, and said operating member being provided with an end face having spaced notches; a resilient element engageable in said groove of said extension for retaining said operating member in place on said extension with said end face abutting said shoulder to longitudinally align said recess with said balls, said operating member being rotatable to position the major axis its elliptical bore in radial alignment with said balls to permit said balls to move radially outward to allow the tool to be inserted in said bore, and said operating member being rotatable to position the minor axis of its elliptical bore in alignment with said balls whereby to project said balls radially inward to cause them to engage in the peripheral groove and retain said tool in place in said holder while permitting limited axial movement of said tool in said holder and a resilient detent element on said body member engageable in said notches to selectively hold said operating member in either of said positions.

7. A tool and holder therefor, comprising: a body member having a bore and provided with a radially extending hole; a ball slidable in said hole, the diameter of said ball being greater than the length of said hole; an annular member rotatably mounted on said body member and provided with an elliptical recess in its inner surface; retaining means for retaining said annular member axially in place on said body member; and a tool having an end adapted to be inserted into said bore and provided with a peripheral recess adjacent said end of greater width than the diameter of said ball, said annular member being rotatable to position the major axis of its recess in alignment with said ball to permit said ball to move radially outward to allow said tool to be inserted in said bore of said body member, and said annular member being rotatable to position the minor axis of its inner recess in alignment with said ball whereby to project said ball radially inward into engagement with said recess of said tool to retain said tool in place in said holder while permitting limited axial movement of the tool therein.

8. A power operated impact device, comprising: a body member having walls defining a cylinder; a hammer member adapted to reciprocate in said cylinder; power means for reciprocating said hammer member; an extension formed integral with said body member and having an annular wall defining a bore axially aligned with said cylinder and adapted to receive an end of a fabricating tool having a peripheral groove adjacent said end, said extension being provided with spaced holes extending radially through its annular wall; balls slidable in said holes, the diameter of said balls being greater than the thickness of said annular wall; an annular operating member rotatably mounted on said extension and provided with spaced recesses in its inner surface, said recesses having cam faces at their ends; retaining means for retaining said operating member in place on said extension with said grooves in longitudinal alignment with said balls, said operating member being adapted to be rotated to a position to cause said cam faces to project said balls radially inward into engagement with said peripheral groove of said fabricating tool when said tool is inserted in said bore to lock said tool in place in said device while permitting reciprocation of said tool under the hammering action of said hammer member and said operating member being adapted to be rotated to another position to radially align its recesses with said balls to permit said balls to move radially outward to release said tool to permit withdrawal of said tool from said device; and detent means for releasably holding said operating member in either of said positions.

9. A pneumatically operated impact device, comprising: a body member having walls defining a cylinder; a hammer member adapted to reciprocate in said cylinder; pneumatic means for effecting reciprocation of said hammer member; an extension formed integral with said body member and having an annular wall defining a bore axially aligned with said cylinder and adapted to receive an end of a fabricating tool having a peripheral groove adjacent said end, said extension being provided with spaced holes extending radially through its annular wall; balls slidable in said holes, the diameter of said balls being greater than the thickness of said annular wall; an annular operating member rotatably mounted on said extension and provided with spaced recesses in its inner surface, said recesses having cam faces at their ends; retaining means for retaining said operating member in place on said extension with said recesses in longitudinal alignment with said balls, said operating member being adapted to be rotated to a position to cause said cam faces to project said balls radially inward into engagement with said peripheral groove of said fabricating tool when said tool is inserted in said bore to lock said tool in place in said device while permitting reciprocation of said tool under the hammering action of said hammer member, and said operating member being adapted to be rotated to another position to radially align its recesses with said balls to permit said balls to move radially outward to release said tool to permit withdrawal of said tool from said device; and detent means for releasably holding said operating member in either of said positions.

RUSSELL J. WENGER.

REFERENCES CITED

The following references are of record in the file of this patent:

UNITED STATES PATENTS

| Number | Name | Date |
|---|---|---|
| 2,333,405 | Appton | Nov. 2, 1943 |

FOREIGN PATENTS

| Number | Country | Date |
|---|---|---|
| 356,021 | Germany | July 11, 1922 |
| 615,769 | Germany | July 12, 1935 |